United States Patent [19]
Fliege

[11] Patent Number: 5,915,488
[45] Date of Patent: Jun. 29, 1999

[54] HYBRID NON-RAIL TIRED VEHICLE WITH SAFETY MECHANISM

[75] Inventor: Hans Fliege, Theres, Germany

[73] Assignee: Fichtel & Sachs AG, Schweinfurt, Germany

[21] Appl. No.: 08/592,479

[22] Filed: Jan. 26, 1996

[30] Foreign Application Priority Data

Jan. 27, 1995 [DE] Germany ............................ 195 02 501

[51] Int. Cl.$^6$ .................................................. B60K 1/00
[52] U.S. Cl. ............................................................ 180/65.2
[58] Field of Search ................................ 180/65.2, 65.3, 180/65.4, 65.8, 283; 388/842–843, 847; 318/141, 142, 143, 151–157

[56] References Cited

U.S. PATENT DOCUMENTS

| | | | |
|---|---|---|---|
| 3,659,672 | 5/1972 | Jacobus | 180/65.4 |
| 3,980,934 | 9/1976 | Wright . | |
| 4,042,864 | 8/1977 | Norris | 318/301 |
| 4,119,861 | 10/1978 | Gocho | 180/65.4 |
| 4,763,262 | 8/1988 | Leiber | 180/197 |
| 4,951,769 | 8/1990 | Kawamura | 180/65.4 |
| 5,212,640 | 5/1993 | Matsuda | 180/197 |
| 5,238,083 | 8/1993 | Horie et al. | 180/65.1 |
| 5,389,824 | 2/1995 | Moroto et al. | 180/283 |
| 5,431,241 | 7/1995 | May et al. | 180/197 |
| 5,472,265 | 12/1995 | Ohnuma | 180/65.1 |
| 5,490,064 | 2/1996 | Minowa et al. | 180/197 |

FOREIGN PATENT DOCUMENTS

| | | | |
|---|---|---|---|
| 96 802 | 6/1984 | Japan | 388/847 |
| 61-236306 | 10/1986 | Japan . | |
| 1074004 | 3/1989 | Japan . | |

*Primary Examiner*—Lanna Mai
*Assistant Examiner*—Faye M. Fleming
*Attorney, Agent, or Firm*—Nils H. Ljungman & Associates

[57] ABSTRACT

The components of a vehicle, in particular of a non-rail vehicle, which is powered by an electric motor traction propulsion system, can be protected against the damaging effects of accelerations which occur during operation by reducing the operating power supplied to a propulsion motor of the vehicle when the accelerations which occur on certain components of the vehicle reach values which pose an immediate danger to these components or reduce their useful life. For this purpose, a traction propulsion system which includes at least one electric motor, a power supply device which supplies the electric motor with operating power and an electronic switching system to control the operating power supplied to the electric motor is equipped with acceleration sensor means and with evaluation means, whereby the acceleration sensor means supply at least one variable which is a function of the acceleration of at least one component of the vehicle, and the evaluation means respond to this variable and control the electronic switching system so that at least in a portion of the range of values of the acceleration-dependent variable, the operating power supplied to the electric motor is reduced in accordance with a specified characteristic.

20 Claims, 6 Drawing Sheets

HYBRID NON-RAIL TIRED VEHICLE WITH SAFETY MECHANISM

BACKGROUND OF THE INVENTION

1. Field of the Invention

The present invention relates to an electric traction propulsion system for a vehicle, in particular a non-rail vehicle.

2. Background Information

The publication "VDI-Berichte No. 878, 1991," Pages 611 to 622, for example, describes electrically-powered, non-rail vehicles, whereby the wheels are propelled by electric motors. On such vehicles, one or more electric motors are supplied with electric operating power from an on-board power system, and the torque generated in the electric motors is transmitted to the drive wheels of the vehicle. Electric motors which can be used here are rotating field or synchro or induction motors of any desired construction, with a rotating field or induction winding which can be divided into a plurality of phase windings. Permanent magnet external rotor motors have been found to be particularly well-suited for this application. The phase windings of the electric motors are powered by a plurality of converters which correspond to the individual motors with phase-shifted, pulsing driver currents. These converters are electronic converters which control the pulsation rate and the amplitude of the driver currents by means of electronic semiconductor valves as required by a traction control device on the vehicle, e.g., by means of an accelerator pedal or a similar device. The converters, in turn, are fed from an on-board power supply system which can be driven by means of a generator, which is driven in turn by an internal combustion engine, for example, but which can also be powered by a rechargeable battery. Differential transmissions and step-down or reducing transmissions can also be used, if necessary, to transmit the torque which is generated by the electric motor to one or more drive wheels.

An electric motor used for a vehicle propulsion system must usually produce a relatively high level of power over a broad range of speeds. The phase windings are thereby fed by the converters with driver currents of up to 1000 Å at up to 2 kHz. At a given frequency and intensity of the driver current, it is also possible, by changing the circuit configuration of the rotating field windings, to change the torque and the speed of the electric motor. As disclosed in EP-A-340,686, for this purpose, the number of phase windings connected in series can be changed by means of a plurality of controllable switches. For this purpose, mechanical switches are generally used, the moving contact elements of which can be adjusted, for example, by means of an electric actuator. On vehicles of the type described above, it is also conventional, in the on-board power supply or in the current leads to the phase windings, to incorporate switches which can de-energize the transmission of power to the electric motors, e.g., in the event of an emergency situation.

The very high accelerations which occur under some circumstances during operation of the vehicle, e.g., when it travels over bumpy ground, can result in significant mechanical loads and thus significant premature fatigue of the structural components of the vehicle, and also of the components of the drive train which transmit the torque. Mechanical switches in the electrical operating power path of the electric motors are particularly susceptible to damage as a result of the acceleration which occurs during travel. An acceleration applied to such a switch can open a switch contact which is normally closed, if the inertial force of the contact element and/or of the actuator connected to this contact element which is applied to the moving contact element on account of the acceleration, overcomes the force of a spring which protects the closing of the contact element. If the switch is carrying current at the time this acceleration occurs, a spark occurs which, at the current intensities indicated above, can result in a significant erosion of the contact element, or even in a destruction of the switch. The measures adopted to counteract this situation generally include making the switches heavier-duty by using correspondingly stronger contact springs, but that in turn exerts an increased force on the actuators which actuate the switches, and thus increases the weight of the entire switching system.

OBJECT OF THE INVENTION

One object of the present invention is the provision of an electric motor traction propulsion system for a vehicle, in particular for a non-rail vehicle, which propulsion system protects the components used in the vehicle against the damaging effects of accelerations which occur during the operation of the vehicle.

SUMMARY OF THE INVENTION

The invention is based on an electric motor traction propulsion system for a vehicle, in particular a non-rail vehicle, which includes:

at least one electric motor, a power supply device which supplies operating power to the electric motor, and an electronic switching system which controls the operating power which is transmitted to the electric motor.

The invention teaches that this object can be accomplished with a traction propulsion system of the type described above, whereby acceleration sensors are located on the vehicle and supply (or determine) at least one variable which is a function of the acceleration of at least one component of the vehicle, and whereby there are evaluation means which respond to the at least one acceleration-dependent variable which control the electronic switching system so that at least in a portion of the range of values of the acceleration-dependent variable, the operating power transmitted to the electric motor is reduced on the basis of a defined characteristic.

This invention teaches that the operating power transmitted to the electric motor is reduced if the accelerations which occur on certain components of the vehicle reach a value which poses a direct danger to these components or reduces their useful life.

The acceleration values which occur on the components of the vehicle are measured by one or more acceleration sensor means which supply variables which are a function of the accelerations of at least one component of the vehicle. Acceleration sensor means which can be used for this purpose are sensors which measure accelerations directly or indirectly. The first type of sensor includes sensors, for example, which make it possible to measure a speed value, and thus by differentiation also make it possible to measure the change of the speed per unit of time, i.e., the instantaneous acceleration, and sensors which measure the distance between two points in a three-dimensional space and thus make it possible to measure the instantaneous acceleration by means of dual differentiation on the basis of time. The invention teaches that the direct determination of the acceleration is accomplished by means of acceleration sensors, which in particular detect at least one translational acceleration in a direction in three-dimensional space (e.g., a vector acceleration).

The acceleration-dependent variable which is measured by the acceleration sensor means is transmitted to an evaluation means, where it is analyzed. As a function of the acceleration-dependent variable measured, the evaluation means, in turn, controls the electronic switching system, which controls the operating power supplied to the electric motor, so that the operating power supplied to the electric motor is reduced on the basis of a specified characteristic when the value of the instantaneous acceleration-dependent variable measured is within a specified range. The evaluation means thereby preferably responds to the amplitude and/or the rate of change of the variable supplied by the acceleration sensor means.

The invention teaches that, in particular, the characteristic is designed so that when the measured variables correspond to low acceleration values, the electric motor is supplied with an unreduced power which can be defined, for example, by means of the position of the accelerator pedal. But if the acceleration-dependent variable corresponds to a measured acceleration value which gives reason to believe that damage may be caused to components of the vehicle, the evaluation circuit causes the electronic switching system which controls the operating power to reduce the operating power which is transmitted to the electric motor, In particular, the invention teaches that the operating power is switched off completely as soon as the acceleration-dependent variable exceeds a specified threshold value.

In one preferred embodiment, the invention teaches that the evaluation means, in addition to the acceleration-dependent variables supplied, also take into consideration variables which represent the instantaneous speed of travel of the vehicle and/or the instantaneous operating power of the electric motor. The former variables can be taken, for example, from a tachometer which is installed in the vehicle, and the latter variables can be output by the electronic switching system which controls the operating power supplied to the electric motor. These variables are included in the analysis performed by the evaluation means, in particular, for example, if the characteristic specified for the reduction of the operating power is modified as a function of these variables.

By including the instantaneous operating power supplied to the electric motor in the specified characteristic, it becomes possible in particular, as the accelerations increase, to continuously reduce the operating power supplied to the electric motor in a range of values of the acceleration-dependent variable which correspond to medium accelerations. For example, the operating power can be reduced only slightly at low to medium acceleration values, and can be reduced more significantly at medium to high accelerations.

To take precautionary measures at the higher acceleration peaks which, on the basis of experience, can be expected at higher speeds of travel, in one preferred embodiment of the invention it is possible, by including the instantaneous speed of travel of the vehicle in the analysis by the evaluation means, to reduce the threshold value which is specified to reduce the operating power, and in particular to shut it off altogether.

In addition to the variables described above, additional measured instantaneous or specified variables which represent the instantaneous condition of the vehicle can be included in the analysis by the evaluation means or in the specified characteristic.

The invention teaches that it is appropriate to represent (and/or store) the specified characteristic in one or more characteristic memories as a characteristic curve or a family of characteristic curves. In particular, the characteristic can be stored in the form of tables, in particular, in the form of so-called "look-up tables".

The evaluation means are preferably realized in the form of electronic circuitry which can operate both on an analog and a digital basis. The invention teaches in particular that the evaluation means are preferably microprocessor controlled, are integrated into a computer which may be installed on the vehicle, and/or can also be stored in the form of a program in this on-board computer. In particular, the characteristic memory can be integrated into the working memory of a microprocessor.

The invention teaches that at least one mechanical switch which has at least one moving contact element can be integrated into the operating power path to the electric motor of the electric power propulsion system. This mechanical switch can in particular be a component of a system which deactuates the motor in case of an emergency. In this case, the invention teaches that when an emergency occurs, e.g., an accident situation, the current flow in the operating power path and thus the operating power supplied to the electric motor can be interrupted. This mechanical switch can be located in the operating power path between the on-board direct current power supply and the converter which supplies the electric motor with pulsating driver currents, or there can be one or more switches between the converter and between the individual rotary field (or induction) windings of the electric motor. A switch which is realized in the form of a single-pole or multiple-pole switch, thereby interrupts one or more live phases of the power supply device.

Mechanical switches are also used in an electric motor traction system, in particular to change the circuit configuration of the rotary field windings of the electric motor, i.e., the number of windings connected in series. In an electric motor propulsion system, for example, there are permanent magnet external rotor motors which have a three-phase field winding, the circuitry of which can be modified by means of mechanical switches inserted between the converter and the individual phase windings to switch between a star connection and a delta connection. These switches are preferably located immediately at the connections of the rotary field windings of the electric motor.

The moving contact elements of the mechanical switches are preferably moved by a mechanical actuator from one switch position into the other. The mechanical actuator, in turn, is moved by an electromagnet, an electric motor, or by means of a pneumatic or hydraulic pressure medium. The closing of the contact between the moving and fixed contact elements is guaranteed by the application pressure of springs, and possibly by bistable springs.

Accelerations of the mechanical switch which occur during travel of the vehicle can result in situations in which the contact elements pressed against one another by the action of the springs may be separated by the acceleration force which is opposite to the spring force exerted on the moving contact elements and/or the mechanical adjustment means. If the mechanical switch is carrying current at such a time, spark erosion can occur and damage the switch.

In one appropriate configuration of the invention, the invention teaches that accelerations which can lead to the opening of the contact elements of the mechanical switch are detected by the acceleration sensor means, and the currents flowing through the switches are reduced, in particular turned off, if the acceleration which occurs at the switch reaches values which can lead to an opening of the contact elements. In particular the characteristic which specifies the reduction of the operating power, and thereby in particular the threshold value which, when it is exceeded by the acceleration-dependent variable, results in the complete deactuation of the operating power, is adapted to the mechanical requirements of the switch and to the limit acceleration which, when it occurs, no longer guarantees the closing of the contact of the moving contact element.

The invention teaches that acceleration sensor means can be advantageously located in the immediate functional vicinity of the mechanical switch, and in particular that these two element can be combined into a single subassembly. The invention teaches that it is particularly advantageous to orient the acceleration sensor means so that the direction in which they are most sensitive to translational accelerations coincides with the three-dimensional direction in which accelerations occur which can most easily open the contact of the moving contact element. It is apparent, however, as explained below, that the acceleration sensor means can alternatively be located separately from the switch, e.g., in front of the switch in the forward direction of travel, so that the acceleration sensor will promptly detect impacts or similar accelerations.

In an additional configuration, the invention teaches that the mechanical components, such as the torque transmission devices which are located between the electric motor and at least one wheel of the vehicle, in particular transmissions and/or universal joint shafts, are protected from the damaging action of severe accelerations, e.g., such as those which occur when the vehicle encounters potholes, because the operating power transmitted to the electric motor is reduced, and thus the load transmitted to the torque transmission devices is also reduced.

For this purpose, the invention teaches that the characteristic which defines the reduction of the operating power is preferably adjusted by the evaluation means to suit the mechanical requirements and load limits of the torque transmission devices. In this case, in particular, it is also appropriate, in addition to the acceleration-dependent variables which are measured by the acceleration sensor means, to measure the operating power which is transmitted to the electric motor in the evaluation means, and to configure the characteristic so that the load limits of the torque transmission equipment are not exceeded by the combined action of the instantaneous acceleration and of the instantaneous torque transmitted.

In an electric motor traction system of the type described above, it is appropriate to locate the acceleration sensor means in the forward direction of travel of the vehicle at some distance in front of the component which must be protected against acceleration by reducing the operating power of the electric motor. This is particularly appropriate in the event that the mechanical switches which are integrated into torque transmission equipment and/or into the operating power path must be protected against the effects of acceleration.

If an electric motor traction drive, for example, has a component which is located in the vicinity of the rear axle of the vehicle and which must be protected against the damaging effects of acceleration, the invention teaches that the acceleration sensor means are preferably located in the vicinity of the front axle, and in particular in front of the front axle, viewed in the direction of forward travel of the vehicle. To protect the torque transmission devices which drive a rear wheel of a vehicle, the invention teaches that it is also advantageous to locate the acceleration sensor means on a front wheel which is in front of this rear wheel.

If there are specialized components in a vehicle which are designed to detect accident situations, e.g., an airbag control switch and/or an accident data storage device, and if there is a mechanical switch which is a component of an emergency off device, and if this mechanical switch is the component which must be protected against accelerations, it is particularly advantageous to also supply variables measured by the airbag control circuit and/or of the accident data storage device to the evaluation means, so that the evaluation means can also respond to these variables, to reduce the operating power which is transmitted to the electric motor.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in a hybrid road vehicle comprising: a chassis; a plurality of wheels being rotationally mounted on the chassis; a plurality of road vehicle tires being disposed on corresponding ones of the plurality of wheels; and a hybrid propulsion system, the hybrid propulsion system comprising: an internal combustion engine; power means connected to the internal combustion engine; at least one motor for propelling at least one of the plurality of wheels; transfer means for transferring power from the power means to the at least one motor; acceleration means for determining and generating a value of at least one acceleration-dependent variable, the at least one acceleration-dependent variable being a function of the acceleration of at least one portion of the vehicle; and control means for controlling the amount of the power transferred from the power means to the at least one motor dependent on at least one of: the determined value of the at least one acceleration-dependent variable generated by the acceleration means, and the rate of change of the determined value of the at least one acceleration-dependent variable generated by the acceleration means.

Another aspect of the invention resides broadly in an electric non-rail vehicle, comprising: a chassis; a plurality of wheels rotationally mounted on the chassis; a plurality of road vehicle tires disposed on corresponding ones of the plurality of wheels; and an electric propulsion system, the electric propulsion system comprising: at least one electric motor for propelling at least one of the plurality of wheels; power supply means for supplying electric power to the at least one electric motor; power transfer means for transferring power from the power supply means to the at least one electric motor; and acceleration sensor means for sensing a value of at least one acceleration-dependent variable, the value of at least one acceleration-dependent variable being a function of the acceleration of at least one portion of the vehicle; the power transfer means comprising control means for controlling the amount of the power transferred from the power supply means to the at least one electric motor as a function of the value of the at least one acceleration-dependent variable.

Yet another aspect of the invention resides broadly in an electric motor propulsion system for a non-rail tired vehicle, the electric motor propulsion system comprising; at least one electric motor; power supply means for supplying power to the at least one electric motor; switching means for transferring the power from the power supply means to the at least one electric motor; acceleration sensor means for sensing a value of at least one variable, the at least one variable being a function of the acceleration of at least one portion of the vehicle; and control means for controlling the amount of the power transferred from the power supply means to the at least one electric motor dependent on at least one of: the sensed value of the at least one variable, and the rate of change of the sensed value of the at least one variable.

BRIEF DESCRIPTION OF THE DRAWINGS

The invention is described in greater detail below, with reference to the embodiments which are illustrated by way of example in the accompanying drawings wherein.

DESCRIPTION OF THE PREFERRED EMBODIMENTS

Figure 1:
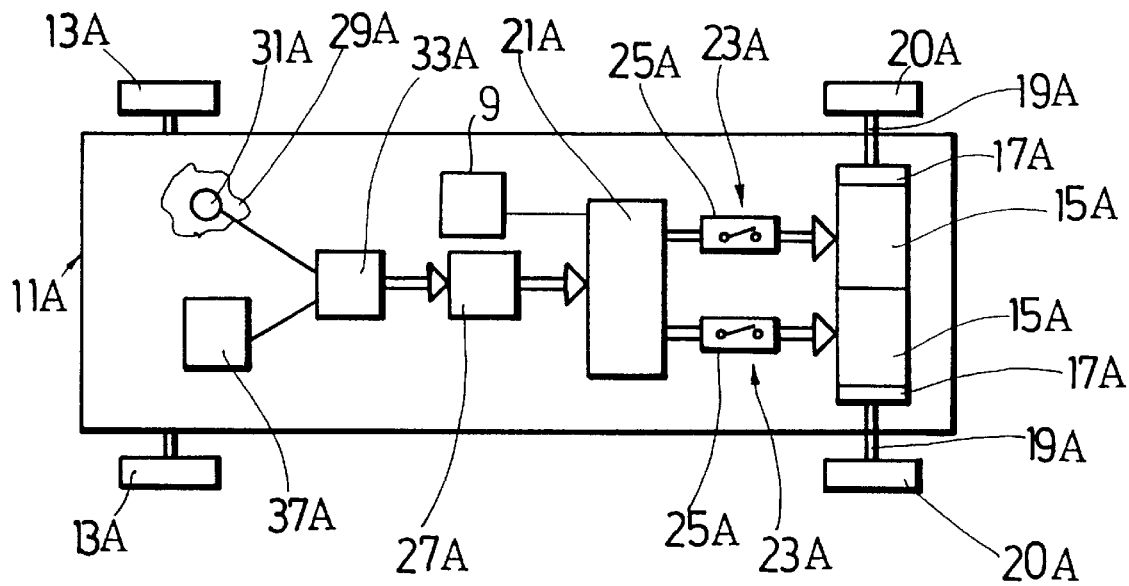
FIG. 1 is a schematic diagram of an electric motor propulsion system for an automotive vehicle.

The schematic diagram in FIG. 1 illustrates a vehicle 11A which comprises two front wheels 13A and two rear wheels 20A, whereby each of the rear wheels 20A is driven by an electric motor 15A by means of a transmission 17A and a universal joint shaft 19A. The individual phase windings of the electric motors 15A are supplied with power from a power supply device 21A which is powered with driver currents by means of schematically illustrated operating power paths 23A. The power supply device 21A thereby includes a generator which is coupled to an internal combustion engine 9, or an on-board power supply system which is supplied by a battery, and preferably also includes electronic converters which control the driver currents which flow through the individual phase windings of the electric motor 15A.

Mechanical switches 25A which are illustrated symbolically in FIG. 1 in the operating power path 23A can be switches which modify the circuit configuration of the phase windings of the electric motors, in particular to switch a three-phase rotary field winding between a star connection and a delta connection, and/or they can be switches which are provided as components of an emergency off device which interrupts the operating power path 23A of the electric motors in emergency situations, e.g., in the event of an accident.

The operating power transmitted to the electric motors 15A from the power supply device 21A is controlled by an electronic switching system 27A.

In the illustration, the vehicle 11A also includes accelerator sensor means 31A which correspond to (e.g., are mounted on or near) a component 29A of the vehicle 11A, as well as evaluation means 33A. The acceleration sensor means 31A supply a variable which is a function of the acceleration of the component 29A, which variable is transmitted to the evaluation means 33A. The evaluation means 33A controls the electronic switching system 27A, so that the operating power transmitted to the electric motors 15A can be reduced in accordance with a specified characteristic if the acceleration-dependent variable supplied by the acceleration sensor means 31A is within a specified range of values. The characteristic is thereby defined so that the operating power transmitted to the electric motors is reduced in particular when the acceleration-dependent variable represents relatively high accelerations of the component 29A. The characteristic is also defined so that as a result of the reduction of the operating power which is transmitted to the electric motor 15A, damage to components of the vehicle caused by excessive acceleration can be prevented by reducing the operating power which is transmitted to the electric motors 15A. In particular, consideration can be given to mechanical switches 25A which are integrated into the operating power path 23A and to torque transmission equipment such as transmissions 17A or universal joint shafts 19A which are located between the electric motors 15A and the drive wheels 20A. For example, if the contact elements of a mechanical switch 25A through which current is flowing are opened by the effect of accelerations which occur during operation, a spark erosion of the contact elements can occur which can reduce the useful life of the switch or even destroy it. Such accelerations can be detected before such spark erosion occurs by the acceleration sensor means 31A, and can be measured and analyzed by the evaluation means 33A, so that the evaluation means 33A cause the electronic switching system 27A to reduce the operating power transmitted to the motor 15A, and thus to reduce the current flowing through the mechanical switches 25A, in particular to shut off the current altogether. In the event of a subsequent opening of the moving contact element caused by the acceleration, no damage can then occur to the switch, since current is no longer flowing through the switch. After a specified length of time, or after the decay of the acceleration, the unreduced operating power can once again be transmitted to the electric motors 15A from the power supply device 21A. Since the severe accelerations required for the opening of the mechanical switches occur only for a very brief period of time during operation of the vehicle, a corresponding interruption of the operating power is also necessary only for brief periods of time, so that the performance and control of the vehicle are not substantially adversely affected by this interruption.

The characteristic can also be configured so that loads on the torque transmission devices such as the transmissions 17A or universal joint shafts 19A can be reduced by reducing the power which is transmitted to the electric motors.

The acceleration sensor means 31A in question can be any appropriate sensors which supply variables which are to some extent a function of an acceleration. In particular, it is appropriate to use acceleration sensors which detect and measure translational accelerations of the component 29A in a specified three-dimensional direction 35A. Since the acceleration values which occur on the component 29A and are measured by the acceleration sensor means 31A may also cause a reduction of the operating power, it is appropriate to locate this component 29A in the vehicle so that the accelerations which occur on it are similar to the accelerations which occur on the component to be protected, and/or so that the acceleration sensor means 31A can record the accelerations which occur on the components to be protected with the maximum possible sensitivity. To be able to record the accelerations which occur as promptly as possible, it is appropriate to locate the acceleration sensors in the vicinity of the front axle, and in particular in front of the front axle, viewed in the direction of forward travel of the vehicle 11A.

If, for example, a mechanical switch 25A located in the operating power path 23A is to be protected against the effects of acceleration, it is particularly appropriate to realize the component 29A in the form of a single structural unit with the mechanical switch 25A, or to attach the acceleration sensor means 31A directly on the switch 25A.

In the characteristic for the reduction of the operating power which is transmitted to the electric motors 15A, in addition to the instantaneous acceleration-dependent variable, it is appropriate to include other variables relating to the instantaneous status of the vehicle 11A, such as its speed or the operating power being transmitted to the electric motors 15A. The characteristic can thereby be stored in a characteristic memory 37A as a characteristic curve or as a family of characteristic curves, in particular in the form of tables, for example, so-called "look-up" tables.

Variants of the invention are explained in greater detail below. Components which correspond to one another are each identified by the same reference number, but are provided with an index to distinguish them from one another. The following explanation refers to the preceding description in its entirety.

Figure 2:
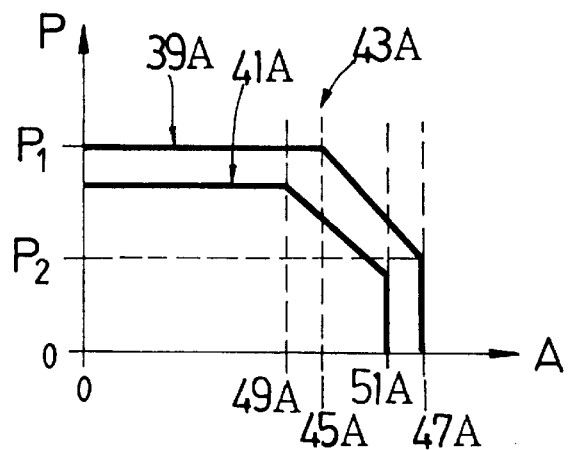
FIG. 2 is a diagram which represents the curve of a characteristic designed to reduce the operating power which is supplied to the electric motor.

FIG. 2 shows a diagram of a family of characteristic curves 43A which consists of two characteristic curves 39A, 41A, whereby the family of curves 43A represents a characteristic which has been designed to reduce the operating power transmitted to an electric motor. In the diagram, the operating power P which is transmitted to an electric motor is represented with respect to the amplitude A of the acceleration-dependent variable A measured by acceleration sensor means 31A. Large values of the acceleration-dependent variable A must therefore also represent large accelerations which occur on the component 29A. At a defined speed of travel of the vehicle, the purpose of the evaluation means 33A is to control the operating power transmitted to the electric motors 15A as specified by the characteristic 39A. In a range of values between zero and a first threshold 45A of the acceleration-dependent variable A, an unreduced operating power $P_1$ is fed to the electric motor by means of an accelerator pedal operated by the driver, for example. In a range of values of the acceleration-dependent variable A between the first threshold value 45A and a second threshold value 47A, which correspond to intermediate accelerations of the component 29A, the operating power supplied to the electric motor 15A is continuously reduced from $P_1$ to $P_2$. In a range of values of the acceleration-dependent variable A which lies above the second threshold value 47A and corresponds to large accelerations of the component 29A, the operating power transmitted to the electric motor 15A is shut off altogether.

If at a second, higher speed of travel of the vehicle, experience dictates that the operating power must be reduced, because greater accelerations also occur at higher speeds of travel, the damaging effects of these greater accelerations on components of the vehicle 11A which must be protected can be prevented if the threshold values 45A and 47A which define the characteristic 39A are shifted toward lower threshold values 49A and 51A, to form a characteristic 41A which controls operation of the vehicle at the higher speeds of travel.

Figure 3:
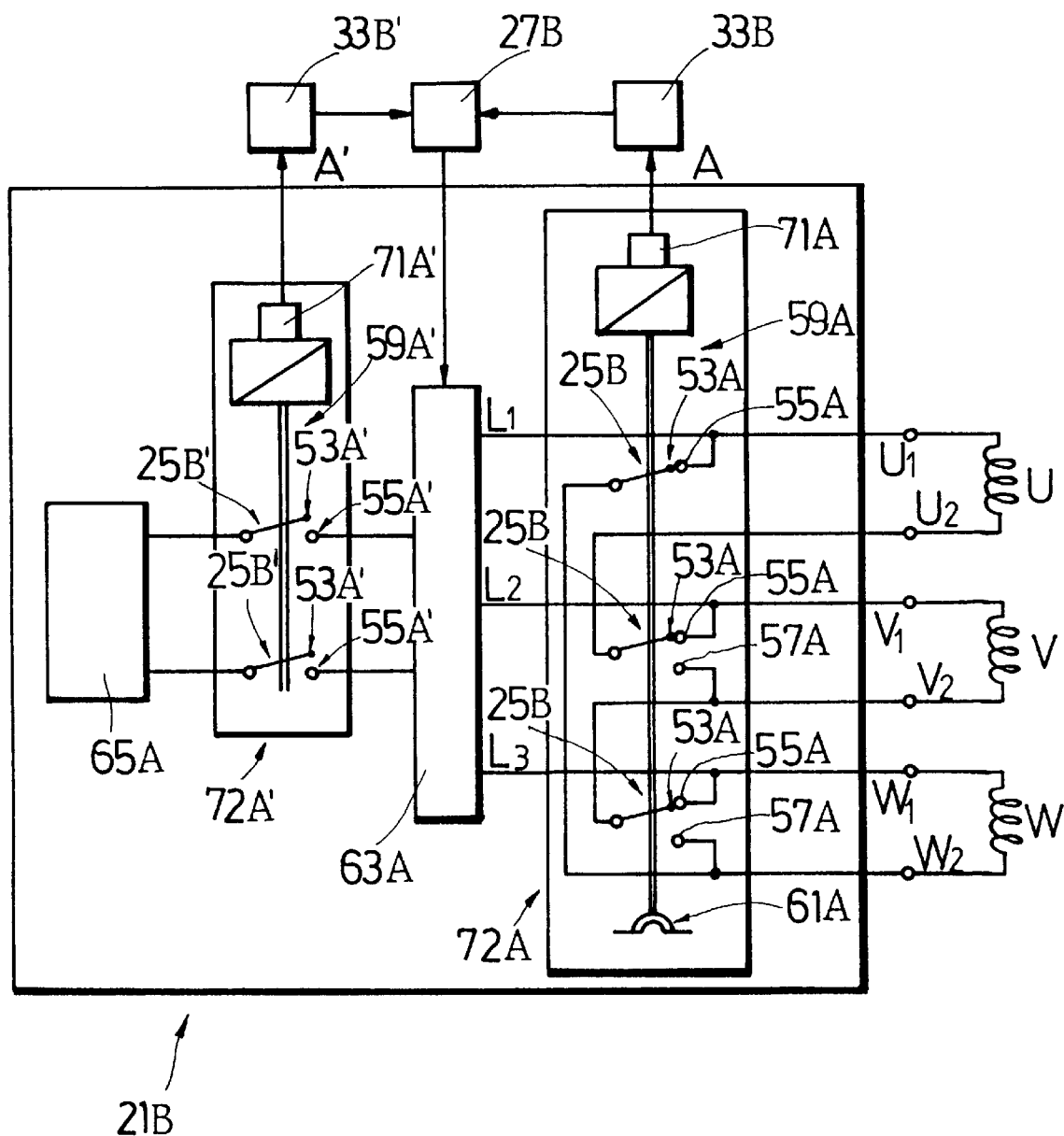
FIG. 3 is a schematic diagram of a power supply apparatus of an electric motor which has mechanical switches in the operating power path.

FIG. 3 shows a schematic diagram of a power supply device which is used to supply power to an electric motor 15A which has three phase windings U, V, and W with the corresponding connections $U_1$, $U_2$, $V_1$, $V_2$ and $W_1$, $W_2$. The switching configuration of the phase windings U, V, W can be switched by means of a mechanical switch 25B, in a conventional manner, from a star connection to a delta connection, For this purpose, the switch 25B comprises three moving contact elements 53A which can be switched between stationary contact elements 55A and 57A. The moving contact elements 53A are connected to one another by means of an electric motor actuator 59A, and a bistable spring 61A in both switch positions exerts the application pressure between the moving and stationary contact elements 53A and 55A, 57A respectively. The driver currents are transmitted to the phase windings U, V, W by means of phase lines $L_1$, $L_2$, $L_3$ from a converter 63A. The converter 63A preferably comprises semiconductor valves which are controlled by the electronic switching system 27B and regulate the amplitude and phase position of the driver currents supplied to the individual windings U, V, W. The converter 63A in turn acquires its operating power from a direct-current on-board power supply 65A which can be supplied by a generator which is driven by an internal combustion engine or which receives its power from a battery, e.g., a rechargeable battery. The current supplied to the converter 63A can be interrupted by a mechanical switch 25B' which is also actuated by an actuator 59A', which mechanical switch 25B' also comprises moving contact elements 53A' and stationary contact elements 55A'.

Accelerations which occur on the switches 25B, 25B' can lead to situations in which, on account of the inertial effect of the moving contact elements 53A, 53A' and of the actuators 59A, 59A', the closing of contacts between the moving contact elements 53A, 53A' and the stationary contact elements 55A, 55A' or 57A is no longer guaranteed. To detect such accelerations promptly and to reduce the currents flowing through the switches, there is preferably provided an acceleration sensor 71A and 71A' on each of the two switches 25B, 25B', respectively, which sensors supply respective acceleration-dependent variables A and A' to the evaluation means 33B and 33B', respectively. The evaluation means 33B and 33B', as a function of their respective range of values of the respective instantaneous acceleration-dependent variables A and A', and by means of the electronic switching system 27B, each reduce the operating power supplied to the phase windings U, V, W by the converter 63B, and thus reduce the currents flowing through the switches.

To measure the accelerations which occur on the switches 25B, 25B' as accurately as possible, the acceleration sensors 71A and 71A' are preferably combined with their corresponding switches 25B and 25B' into subassemblies 72A and 72A', respectively.

Figure 4:
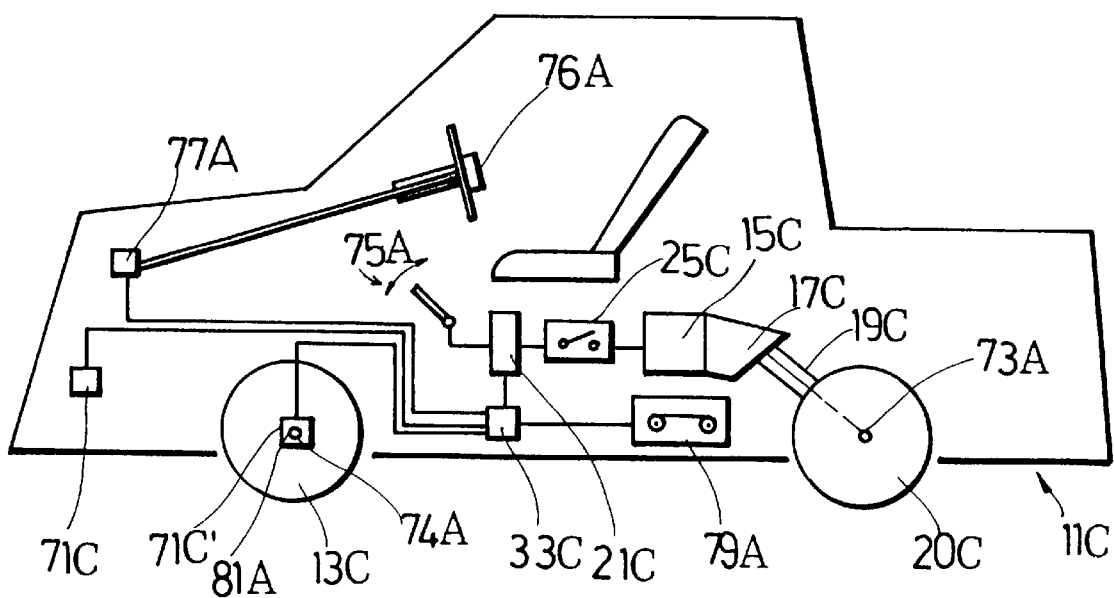
FIG. 4 is a schematic diagram which illustrates a vehicle equipped with an electric motor propulsion system.

FIG. 4 shows a schematic illustration of a vehicle 11C which has a rear axle 73A which is driven by an electric motor 15C by means of a transmission 17C and a universal joint shaft 19C, a front axle 74A, a rear wheel 20C and a front wheel 13C. In the operating power path of the electric motor 15C, there is a switch 25C which functions as an emergency off switch. The vehicle also comprises an accelerator pedal 75A which can be used to control the operating power desired by the driver of the vehicle or the desired speed of travel of the vehicle, as well as an airbag 76A and an airbag control circuit 77A to protect the driver in accident situations, as well as an accident data storage device 79A for purposes of documenting the occurrence of an accident.

The vehicle 11C also has acceleration sensors 71C and 71C'. To protect the transmission 17C and the universal joint shaft 19C, the acceleration sensors 71C and 71C' are connected to evaluation means 33C which reduces the operating power supplied to the electric motor 15C in accordance with a specified characteristic. The acceleration sensor 71C is preferably located in front of the front axle 74A, viewed in the forward direction of travel. As a result of the relatively large distance from the center of gravity of the vehicle, this acceleration sensor 71C therefore has a relatively high sensitivity to forward and backward accelerations of the front of the vehicle. The acceleration sensor 71C' is preferably located directly on the axis 81A of the front wheel 13C which is in front of the rear wheel 20C, and is therefore particularly sensitive to accelerations which occur when the vehicle encounters potholes.

To protect the mechanical switch 25C from accelerations which may occur in accident situations, the information from the airbag control circuit 77A and from the accident data storage device 79A are preferably also transmitted to the evaluation means 33C.

Some examples of electrically powered vehicles which may be utilized in conjunction with the present invention are to be found in U.S. Pat. No. 5,212,431, issued to Origuchi et al. on May 18, 1993 and entitled "Electric Vehicle"; U.S. Pat. No. 5,215,156, issued to Stulbach on Jun. 1, 1993 and entitled "Electric Vehicle With Downhill Electro-Generating System"; U.S. Pat. No. 5,222,568, issued to Higasa et al. on Jun. 29, 1993 and entitled "Electric Vehicle"; U.S. Pat. No. 5,277,285, issued to Musachio on Jan. 11, 1994 and entitled "Electric Vehicle"; U.S. Pat. No. 5,309,073, issued to Kaneko et al. on May 3, 1994 and entitled "Electric Vehicle"; and U.S. Pat. No. 5,318,355, issued to Asanuma et al. on Jun. 7, 1994 and entitled "Brake System in Electric Vehicle", all of these U.S. patents being hereby expressly incorporated by reference herein.

Some examples of acceleration sensors which may be utilized in conjunction with the present invention are to be found in U.S. Pat. No. 5,177,370, issued to Meister on Jan. 5, 1993 and entitled "Impact Sensor for Vehicle Safety Restraint System"; U.S. Pat. No. 5,181,011, issued to Okano on Jan. 19, 1993 and entitled "Method for Checking the Operability of Safety System for Vehicles"; U.S. Pat. No. 5,235,529, issued to Hanson et al. on Aug. 10, 1993 and entitled "Real Time Suspension Control With Digital All-Pass, High-Pass Filter"; U.S. Pat. No. 5,251,929, issued to Kawabata on Oct. 12, 1993 and entitled "Hydraulic Supply Arrangement for Use With Active Automotive Suspension or the Like"; and U.S. Pat. No. 5,265,472, issued to Pfeifle et al. on Nov. 30, 1993 and entitled "Process for Compensating Acceleration Sensor Errors", all of these U.S. patents being hereby expressly incorporated by reference herein.

Some examples of electrical actuators which may be utilized in conjunction with the present invention are to be found in U.S. Pat. No. 5,187,336, issued to Lang et al. on Feb. 16, 1993 and entitled "Switch Assembly With Transfer Actuator"; U.S. Pat. No. D344,265, issued to Schaeffer on Feb. 15, 1994 and entitled "Electrical Switch Actuator"; U.S. Pat. No. 5,286,935 issued to Mina at al. on Feb. 15, 1994 and entitled "Self-Locating, Prepositioning Actuator for an Electrical Switch Enclosure"; U.S. Pat. No. D344,930 issued to Schaeffer on Mar. 8, 1994 and entitled "Pushbutton Actuator for an Electrical Switch"; U.S. Pat. No. D345,344 issued to Schaeffer on Mar. 22, 1994 and entitled "Actuator for an Electrical Switch"; and U.S. Pat. No. D349,101 issued to Schaeffer on Jul. 26, 1994 and entitled "Electrical Switch Actuator", all of these U.S. patents being hereby expressly incorporated by reference herein.

Some examples of comparators used with microprocessors which may be utilized in conjunction with the present invention are to be found in U.S. Pat. No. 5,184,163 issued to Wagerer on Feb. 2, 1993 and entitled "Remote Trigger Method and Apparatus for a Camera Shutter"; U.S. Pat. No. 5,191,375 issued to Hamilton on Mar. 2, 1993 and entitled "Fuser Low Power Control"; U.S. Pat. No. 5,268,836, issued to Eckert et al. on Dec. 7, 1993 and entitled "Mailing Machine Including Printing Drum Deceleration and Coasting Control System"; U.S. Pat. No. 5,271,254 issued to Gloe et al. on Dec. 21, 1993 and entitled "Crimped Connector Quality Control Method Apparatus"; U.S. Pat. No. 5,355,136 issued to Katagiri on Oct. 11, 1994 and entitled "Analog-to-Digital Converter Circuit"; and U.S. Pat. No. 5,376,925 issued to Crisafulli et al. on Dec. 27, 1994 and entitled "Motion and Direction Sensors", all of these U.S. patents being hereby expressly incorporated by reference herein.

Some examples of computers used with airbag safety systems which may be utilized in conjunction with the present invention are to be found in U.S. Pat. No. 5,359,515 issued to Weller et al. on Oct. 25, 1994 and entitled "Vehicle Occupant Safety System and Method for Operating the Same"; and U.S. Pat. No. 5,300,011 issued to Budde et al. on Apr. 5, 1994 and entitled "Automatic Airbag Folding Apparatus and Method", all of these U.S. patents being hereby expressly incorporated by reference herein.

Some examples of circuits which use star and delta phase windings which may be utilized in conjunction with the present invention are to be found in U.S. Pat. No. 5,177,460 issued to Dhyanchand et al. on Jan. 5, 1993 and entitled "summing Transformer for Star-Delta Inverter Having a Single Secondary Winding for Each Group of Primary windings"; and U.S. Pat. No. 5,182,535 issued to Dhyanchand on Jan. 26, 1993 and entitled "Summing Transformer Core for Star-Delta Inverter Having a Separate Secondary Winding for Each Primary Winding", all of these U.S. Patents being hereby expressly incorporated by reference herein.

The following foreign references are hereby expressly incorporated by reference herein: DE 31 16867 A 1, DE 43 23 604 A 1, DE 41 39 469 A 1, DE 37 44264 A 1, DE 43 05 819 A 1, and Das elektrische Getriebe von Magnet-Motor für PKW und Omnibusse, as found in the "VDI-Berichte No. 878, 1991," Pages 611 to 622.

One feature of the invention resides broadly in an electric motor traction propulsion system for a vehicle 11A, in particular a non-rail vehicle, comprising: at least one electric motor 15A, a power supply device 21A which supplies operating power P to the electric motor 15A, and an electronic switching system 27A to control the operating power supplied to the electric motor 15A characterized by the fact that located on the vehicle 11A are acceleration sensor means 31A which supply at least one variable A which is a function of the acceleration of at least one component 29A of the vehicle 11A, and that there are evaluation means 33A which respond to the at least one acceleration-dependent variable A, which evaluation means 33A control the electronic switching system 27A so that at least in a portion of the range of values of the acceleration-dependent variable A, the operating power P supplied to the electric motor 15A is reduced in accordance with a defined characteristic.

Another feature of the invention resides broadly in the traction propulsion system characterized by the fact that the evaluation means 33A respond to the amplitude and/or to the rate of change of the variable A supplied by the acceleration sensor means.

Yet another feature of the invention resides broadly in the traction propulsion system characterized by the fact that the acceleration sensor means 31A have at least one sensor 71A which detects translational accelerations.

Still another feature of the invention resides broadly in the propulsion system characterized by the fact that the evaluation means 33A, by means of the electronic switching system 27A, reduce the operating power P transmitted to the electric motor 15A, and in particular shut it off altogether if the acceleration-dependent variable A exceeds a specified threshold value 45A, 49A or 47A, 41A.

A further feature of the invention resides broadly in the propulsion system characterized by the fact that the specified characteristic is a function of a variable which represents the instantaneous speed of the vehicle 11A and/or a variable which represents the instantaneous operating power.

Another feature of the invention resides broadly in the propulsion system characterized by the fact that the specified characteristic comprises at least one characteristic 39A, 41A stored, in particular in the form of a table, in a characteristic memory 37A.

Yet another feature of the invention resides broadly in the traction propulsion system characterized by the fact that the power supply device 21A has at least one mechanical switch 25A which has at least one moving contact element 53A in the electrical operating power path 23A to the electric motor, and that the evaluation means 33A, by means of the mechanical switch 25A, reduce the operating power P supplied to the electric motor 15A, and in particular shut it off altogether, when the acceleration-dependent variable A represents an acceleration of the switch 25A which is above a threshold value 45A, 49A or 47A, 51A which represents the contact opening acceleration of the switch 25A.

Still another feature of the invention resides broadly in the traction propulsion system characterized by the fact that the mechanical switch 25A is a component of an emergency off device.

A further feature of the invention resides broadly in the traction propulsion system characterized by the fact that the acceleration sensor means 31A are components of an airbag control circuit 77A and/or an accident data storage device 79A.

Another feature of the invention resides broadly in the traction propulsion system characterized by the fact that the electric motor 15A has a rotary field winding divided into a plurality of phase windings U, V, W and the power supply device 21A has an electronic converter system which is connected to the phase windings U, V, W, whereby the circuit configuration of the phase windings U, V, W can be modified by means of the switch 25A, and in particular can be switched between a start connection and a delta connection in a three-phase rotary field winding.

Yet another feature of the invention resides broadly in the traction propulsion system characterized by the fact that the mechanical switch 25A comprises an actuator 59A, in particular an electric motor actuator, which is used to actuate the moving contact element 53A.

Still another feature of the invention resides broadly in the traction propulsion system characterized by the fact that the acceleration sensor means 31A comprise at least one acceleration sensor 71A which is mounted with the switch 25A on a common component 72A of the vehicle, in particular on the electric motor 15A.

A further feature of the invention resides broadly in the traction propulsion system characterized by the fact that the acceleration sensor means 31A comprise at least one acceleration sensor which is located on the vehicle, in the direction of forward travel of the vehicle, at some distance in front of a component which is to be protected against the effect of acceleration by reducing the operating power of the electric motor 15A, and in particular at some distance in front of a mechanical switch 25A which is located in the operating power path 23A of the power supply device 21A.

Another feature of the invention resides broadly in the traction propulsion system characterized by the fact that the component to be protected is located in the vicinity of the rear axle 73A of the vehicle 11A and the acceleration sensor 71A is located in the vicinity of the front axle, in particular in front of the front axle in the forward direction of travel.

Yet another feature of the invention resides broadly in the traction propulsion system characterized by the fact that the electric motor 15A is connected to at least one wheel 13A, 20A of the vehicle 11A by means of a torque transmission device 17A, 19A, in particular a transmission 17A and/or a universal joint shaft 19A, and that the evaluation means 53A reduce the operating power transmitted to the electric motor 15A, in particular they turn it off completely when the acceleration-dependent variable A exceeds a specified threshold value 45A, 49A or 47A, 51A.

Figure 5:
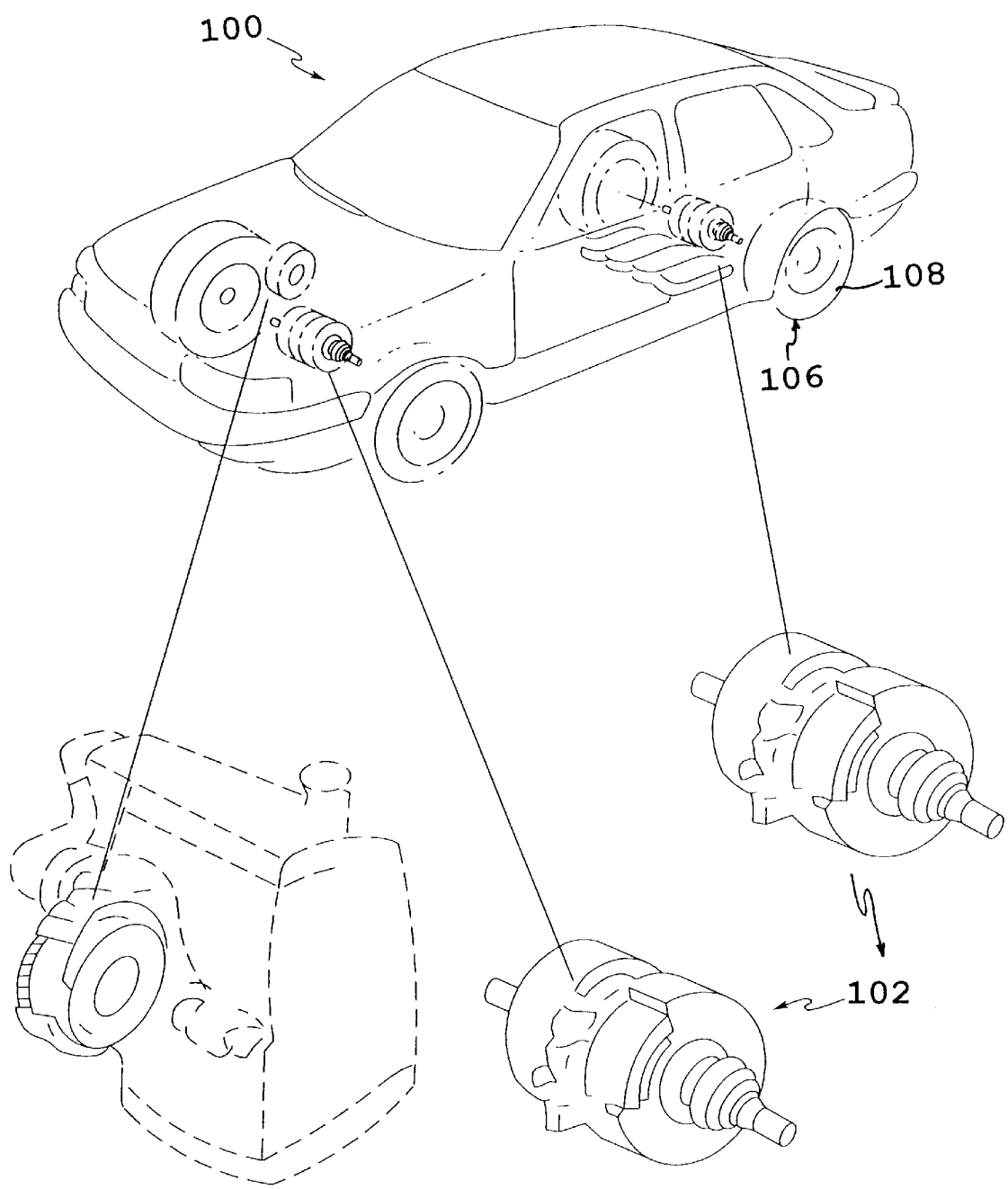
FIG. 5 illustrates a typical automobile which may employ a hybrid drive, such as an internal combustion engine-electric generator unit.

FIG. 5 illustrates a typical electric road motor vehicle, such as an automobile, in which the present invention may be employed. As shown, an automobile 100 may include two electric motor arrangements, 102, wherein each such motor arrangement can conceivably include two motors for driving a corresponding wheel. It will be appreciated from the disclosure herebelow that such motor arrangements can be driven by a combination, or hybrid, internal combustion engine-electric generator.

Also shown in FIG. 5 are a typical wheel 106, and a road vehicle tire 108 mounted on wheel 106.

The present invention may be employed, for example, in the assembly of other electric road motor vehicles, such as buses. Buses, for example, must frequently be designed to accommodate specific road widths, some road widths being extremely narrow relative to other road widths. The present invention, employed in a street bus or an airport bus, for instance, can make possible the specific track distance and dimensions required for assembly of buses for either narrow or wide roads.

Figure 6:
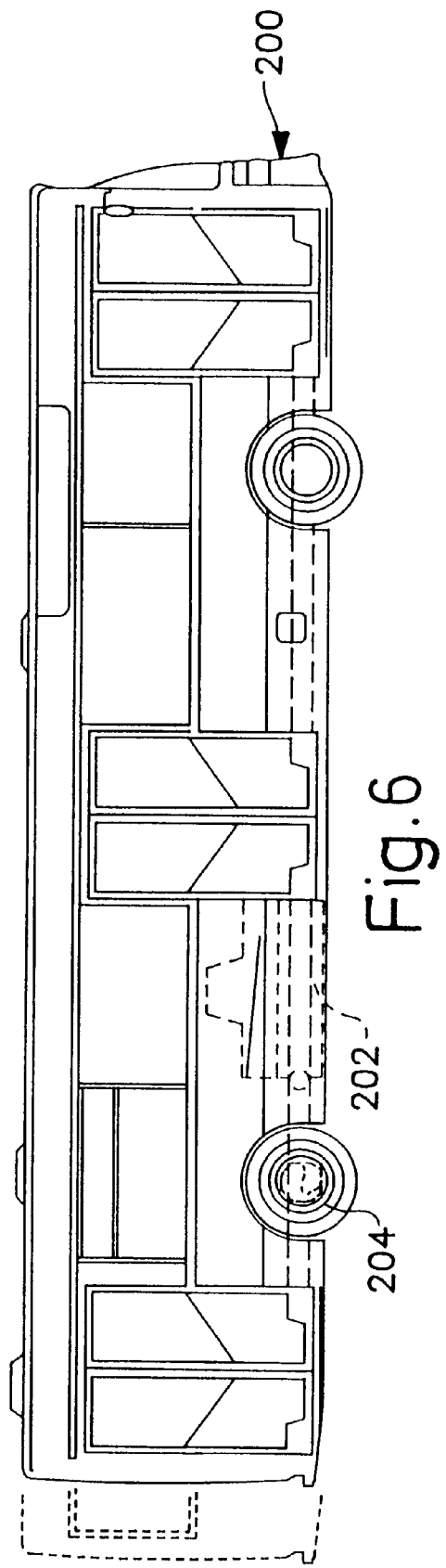
FIGS. 6 and 7 illustrate elevational and plan views, respectively, of a bus, such as an urban public transportation bus, which may employ one or more hybrid drives.
Figure 7:
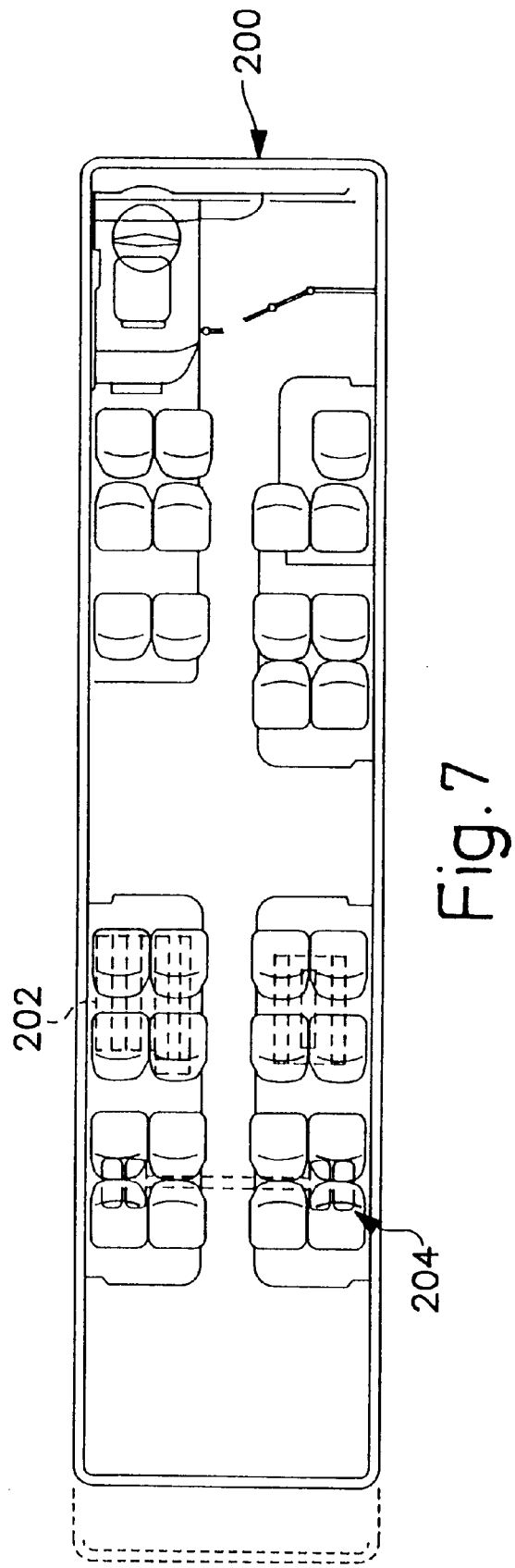

FIGS. 6 and 7 illustrate, respectively, a conventional urban transportation bus 200 in elevational and plan view, in which the present invention may be employed. Particularly, the bus 200 may include an internal combustion engine-electric generator unit 202 for powering individual motors associated with corresponding wheels or sets of wheels. In the bus 200 shown in FIGS. 19 and 20, the internal combustion engine-electric generator unit 202 is shown as being positioned immediately forward of a rearmost set of wheels 204.

Figure 8:
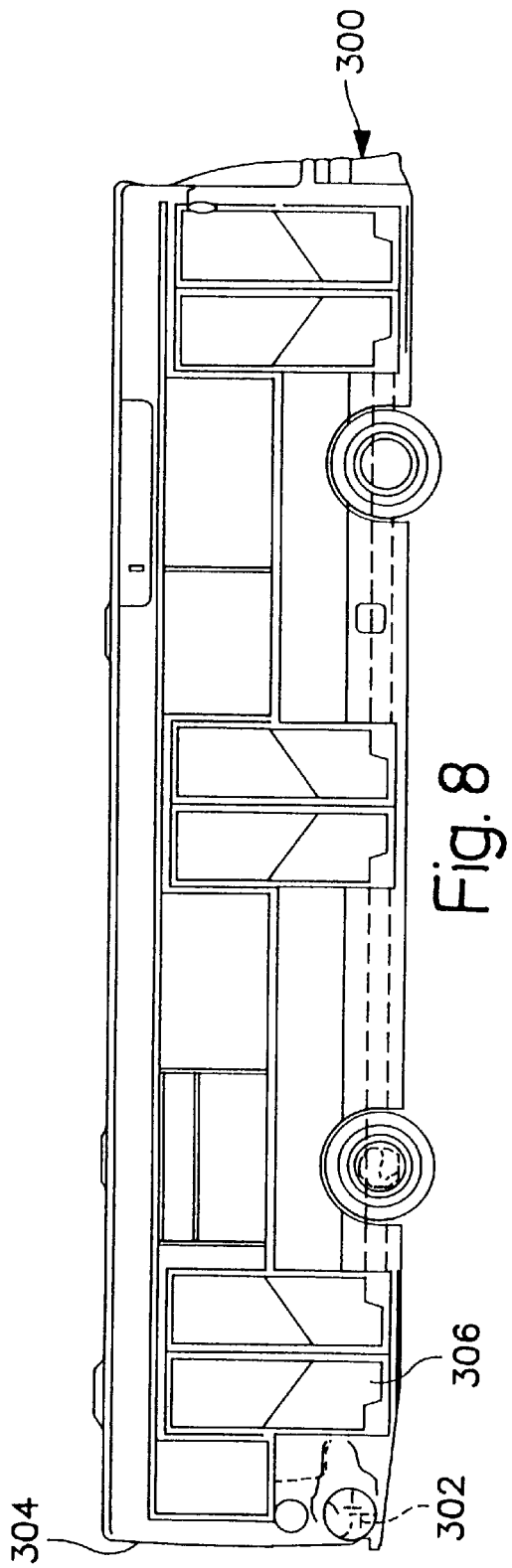
FIGS. 8 and 9 illustrate elevational and plan views, respectively, of another bus, such as an urban public transportation bus, which may employ one or more hybrid drives.
Figure 9:
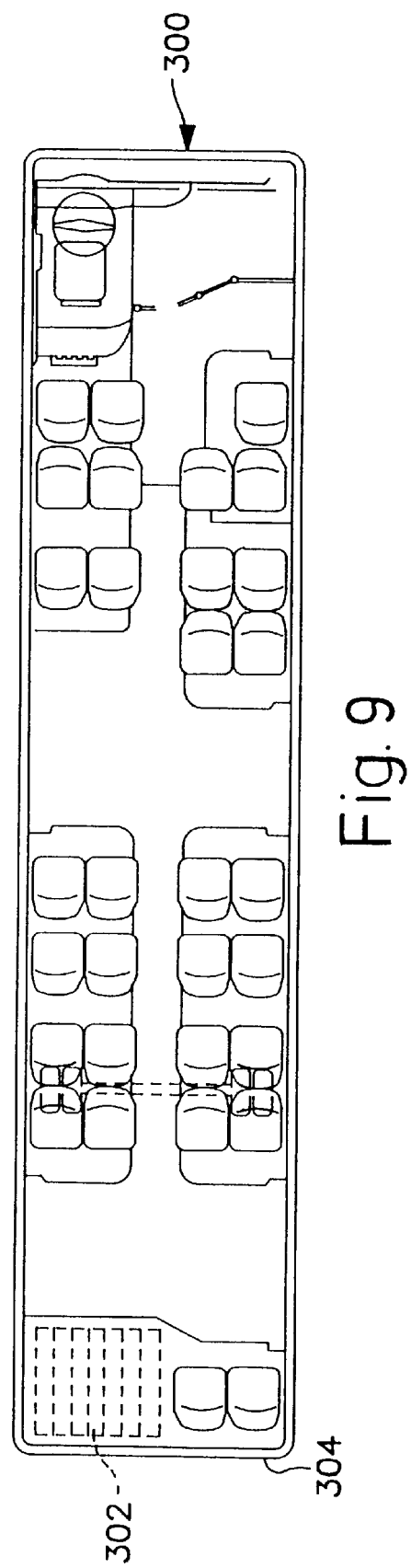

FIGS. 8 and 9 illustrate, respectively, another conventional urban transportation bus 300 in elevational and plan view, in which the present invention may be employed. Particularly, the bus 300 may include an internal combustion engine-electric generator unit 302 for powering individual motors associated with corresponding wheels or sets of wheels. In the bus 300 shown in FIGS. 8 and 9, the internal combustion engine-electric generator unit 302 is shown as being positioned virtually directly adjacent the rear panel portion 304 of the bus 300, and behind a rearmost set of doors 306.

Examples of coolant pumps, and other general components related to vehicular cooling systems, which may be utilized in accordance with the embodiments of the present invention, may be found in the following U.S. Pat. Nos.: 5,226,787, which issued to Freeman on Jul. 13, 1993; No. 5,317,994, which issued to Evans on Jun. 7, 1994; No. 5,337,704, which issued to Roth on Aug. 16, 1994; No. 5,353,751, which issued to Evans on Oct. 11, 1994.

Examples of heat exchangers, which may be utilized in accordance with the embodiments of the present invention, may be found in the following U.S. Pat. Nos.: No. 5,176,200, which issued to Shinmura on Jan. 5, 1993; No. 5,180,003, which issued to Kouzel et al. on Jan. 19, 1993; No. 5,180,005, which issued to Marsais et al. on Jan. 19, 1993; No. 5,180,006, which issued to Marsais et al. on Jan. 19, 1993; No. 5,183,107, which issued to Le Gauyer on Feb. 2, 1993; No. 5,184,672, which issued to Sanden on Feb. 9, 1993.

Examples of coolers, which may be utilized in accordance with the embodiments of the present invention, may be found in the following U.S. Pat. Nos.: No. 5,228,512, which issued to Bretl et al. on Jul. 20, 1993; No. 5,234,051, which issued to Weizenburger et al. on Aug. 10, 1993; No. 5,251,692, which issued to Haussmann on Oct. 12, 1993; No, 5,267,624, which issued to Christensen on Dec. 7, 1993; No. 5,307,865, which issued to Inagaki et al. on May 3, 1994.

Examples of IGBT components, which may be utilized in accordance with the embodiments of the present invention, may be found in the following U.S. Pat. Nos.: No. 5,182,626, which issued to Akiyama et al. on Jan. 26, 1993; No. 5,200,878, which issued to Sasagawa et al. on Apr. 6, 1993; No. 5,274,541, which issued to Kimura et al. on Dec. 28, 1993; No. 5,283,202, which issued to Pike, Jr. et al. on Feb. 1, 1994.

Examples of general bipolar transistors, which may be utilized in accordance with the embodiments of the present invention, may be found in the following U.S. Pat. Nos.: No. 5,177,582, which issued to Meister et al. on Jan. 5, 1993; No. 5,177,583, which issued to Endo et al. on Jan. 5, 1993; No. 5,178,370, which issued to Clark et al. on Jan. 12, 1993.

Examples of MOSFET components, which may be utilized in accordance with the embodiments of the present invention, may be found in the following U.S. Pat. Nos.: No. 5,177,207, which issued to Lowrey at al. on Jan. 5, 1993; No. 5,177,571, which issued to Satoh et al. on Jan. 5, 1993; No. 5,191,396, which issued to Lidow et al. on Mar. 2, 1993; No. 5,200,632, which issued to Sakurai on Apr. 6, 1993.

Examples of BIMOS components, which may be utilized in accordance with the embodiments of the present invention, may be found in the following U.S. Pat. Nos.: No. 5,187,395, which issued to Pirez on Feb. 16, 1993; No. 5,198,691, which issued to Tarng on Mar. 30, 1993; No. 5,212,398, which issued to Mateunaga et al. on May 18, 1993; No. 5,256,582, which issued to Mosher et al. on Oct. 26, 1993.

Examples of resolver arrangements, which may be utilized in accordance with the embodiments of the present invention, may be found in the following U.S. Pat. Nos.: No. 5,189,353, which issued to Ezuka on Feb. 23, 1993; No. 5,200,682, which issued to Kim et al. on Apr. 6, 1993; No. 5,239,288, which issued to Tsals on Aug. 24, 1993; No. 5,304,909, which issued to Jin et al. on Apr. 19, 1994.

Examples of temperature sensors, which may be utilized in accordance with the embodiments of the present invention, may be found in the following U.S. Pat. Nos.: No. 5,235,850, which issued to Schurmann on Aug. 17, 1993; No. 5,343,613, which issued to Kintz at al. on Sep. 6, 1994; No. 5,230,222, which issued to ERbs on Jul. 27, 1993; 5,307,690, which issued to Hanazawa on May 3, 1994; No. 5,309,133, which issued to Berger et al. on May 3, 1994.

Some examples of hybrid engines and control systems therefor which may be utilized in accordance with the present invention are disclosed in the following U.S. Pat. Nos.: No. 4,305,254 to Kawakatsu et al. on Dec. 15, 1981, entitled "Control Apparatus and Method for Engine/Electric Hybrid vehicle"; and No. 4,335,429 to Kawakatsu on Jun. 15, 1982, entitled "Control Apparatus for Engine/Electric Hybrid Vehicle".

Some examples of electric motors which can be operated as generators which may be utilized in accordance with the present invention are disclosed in the following U.S. Pat. Nos.: No. 5,327,992 to Boll on Jul. 12, 1994, entitled "Method for Controlling a Hybrid Drive Which Drives a Vehicle"; No. 5,249,637 to Heidi et al. on Oct. 5, 1993, entitled "Hybrid vehicle"; and No. 5,323,743 to Kristiansson on Jun. 28, 1994, entitled "Sure-start Device for Internal Combustion Engine".

Some examples of generators which can be operated as motors which may be utilized in accordance with the present invention are disclosed in the following U.S. Pat. Nos.: No. 5,272,379 to Sugiyama et al. on Dec. 21, 1993, entitled "Power Supply Device for an Electric Vehicle"; No. 5,283,471 to Raad on Feb. 1, 1994, entitled "DC Generator and Back-up Engine Starting Apparatus"; and No. 5,281,905 to Dhyanchand et al. on Jan. 25, 1994, entitled "Induction Machine Based Hybrid Aircraft Engine Starting/Generating Power System".

Some examples of converters which may utilized in accordance with the present invention are disclosed in the following U.S. Pat. Nos.: No. 4,651,078 to Todoroki et al. on Mar. 17, 1987, entitled "Device for Driving an Induction Motor"; No. 4,673,858 to Saito on Jun. 16, 1987, entitled "Power Converter for AC Load"; No. 4,757,435 to Wood et al. on Jul. 12, 1988, entitled "Static-controlled Current-source AC/DC Power Converter and DC/AC Power Converter, and Protection System Embodying the Same"; No. 4,636,927 to Rhyne et al. on Jan. 13, 1987, entitled "DC to AC Converter"; No. 4,181,932 to Fujiwara on Jan. 1, 1980, entitled "Power Converter"; No. 4,366,532 to Rosa et al. on Dec. 28, 1982, entitled "AC/DC or DC/AC Converter System With Improved AC-line Harmonic Reduction"; No. 4,165,801 to Watanabe at al. on Aug. 28, 1979, entitled "Static Leonard System"; and No. 4,894,762 to Steinshorn on Jan. 16, 1990, entitled "Method and Apparatus to Avoid Commutation Failure in a Regenerative Converter".

Some examples of DC to AC converters which may be utilized in accordance with the present invention are disclosed in the following U.S. Pat. Nos.: No. 4,173,040 to Borzov et al. on Oct. 30, 1979, entitled "DC to AC Voltage Converter"; No. 4,196,469 to Gurwicz on Apr. 1, 1980, entitled "DC-AC Converter Including Synchronized Switching"; No. 4,453,205 to Brakus on Jun. 5, 1984, entitled "DC/AC Converter With Shunt Regulated Load"; No. 4,443,750 to Altena on Apr. 17, 1984, entitled "Energy Saving Motor Speed Controller"; No. 4,446,052 to Thrap on Aug. 14, 1984, entitled "Programmable DC-To-AC Voltage Converter"; and No. 4,528,457 to Keefe et al. on Jul. 9, 1985, entitled "DC-AC Converter for Supplementing an AC Power Source".

Some examples of AC to DC converters which may be utilized in accordance with the present invention are disclosed in the following U.S. Pat. Nos.: No. 4,639,848 to Sakai on Jan. 27, 1987, entitled "Method and System for Controlling an AC-DC Converter System"; No. 4,656,571 to Umezu on Apr. 7, 1987, entitled "Frequency Converting Device and Control Method Therefor"; No. 4,739,466 to Glennon et al. on Apr. 19, 1988, entitled "Regulated AC/DC Converter"; No. 4,85,837 to Gulazynski on Aug. 1, 1989, entitled "Synchronous Switching Power Supply With Flyback Converter"; and No. 4,719,552 to Albach et al. on Jan. 12, 1988, entitled "AC-DC Converter Triggered by Variable Frequency Pulses".

Some examples of variable frequency converters which may be utilized in accordance with the present invention are disclosed in the following U.S. Pat. Nos.: No. 4,743,777 to Shilling et al. on May 10, 1988, entitled "Starter Generator System With Two Stator Exciter Windings"; and No. 5,093,751 to Yuki et al. on Mar. 3, 1992, entitled "Carry Noise Measuring System for Magnetic Recording Medium".

An example of a DC to DC converter which may be utilized in accordance with the present invention is disclosed in U.S. Pat. No. 4,513,361 to Rensink on Apr. 23, 1985, entitled "Multi-phase DC-to-AC and DC-to-DC Boost Converter".

Examples of voltage monitors and voltage regulators which may be utilized in accordance with the present invention may be disclosed in the following U.S. Pat. Nos.: No. 5,302,889 to Marsh on Apr. 12, 1994, entitled "Voltage Regulator"; No. 5,264,781 to Miller et al. on Nov. 23, 1993, entitled "Current Control/Power Limiter Circuit"; and No, 5,255,177 to Oku on Oct. 19, 1993, entitled "High-voltage Power Source Control Device", Examples of hybrid drive arrangements, such as internal combustion engine-electric generator arrangements, and components associated therewith, such as control arrangements and individual motors for driving corresponding wheels, may be found in the following U.S. Pat. Nos.: No. 5,327,987, which issued to Abdelmalak on Jul. 12, 1994; No. 5,318,142, which issued to Bates et al. on Jun. 7, 1994; No. 5,301,764, which issued to Gardner on Apr. 12, 1994; No. 5,249,637, which issued to Heidl at al. on Oct. 5, 1993; No. 5,176,213, which issued to Kawai et al. on Jan. 5, 1993; No. 5,327,992, which issued to Boll on Jul. 12, 1994; No. 5,291,960, which issued to Brandenburg et al. on Mar. 8, 1994; and No. 5,264,764, which issued to Kuang on Nov. 23, 1993.

Examples of electric and hybrid vehicles, and related components, may be or are disclosed in the following U.S. Pat. Nos.: No. 5,251,721 entitled "Semi-hybrid Electric Automobile" to Ortenheim; No. 5,004,061 entitled "Electrically Powered Motor Vehicle" to Andruet; No. 5,289,100 entitled "System for Powering, Speed Control, Steering, and Braking" to Joseph; No. 5,265,486 entitled "Portable External Drive Assembly" to AAMCO Corporation; No. 5,289,890 entitled "Drive Unit for Electric Motor Vehicle" to Aisin; and No. 5,310,387 entitled "Differential Motor Drive" to Hughes Aircraft Company.

Additional examples of electric vehicles in which the present invention may be utilized may be or are disclosed in the following U.S. Pat. Nos.: No. 5,166,584 entitled "Electric Vehicle" to Nissan; No. 5,161,634 entitled "Electric Vehicle" to Kubota Corporation; and No. 5,150,045 entitled "Electric Automobile" to Kaisha.

Examples of electronic commutation devices, which may be utilized in accordance with the embodiments of the present invention, may be found in the following U.S. Pat. Nos.: No. 5,164,623 entitled "Independent-drive Wheel for a Wheel-mounted Vehicle"; No. 5,117,167 entitled "Commutating Energy Suppression Circuit for an Electronically Commutated DC Motor" to Rotron; No. 5,258,679 entitled "Structure of DC Motor with Electronic Commutation" to ECIA; and No. 5,117,167 entitled "Commutating Energy Suppression Circuit for an Electronically Commutated DC Motor" to Rotron.

Examples of phase angle sensors, which may be utilized in accordance with the embodiments of the present invention, may be found in the following U.S. Pat. Nos.; No. 5,203,290 entitled "Intake and/or Exhaust-valve Timing Control System for Internal Combustion Engine" to Atsugi Unisia; No. 5,277,063 entitled "Single Plane Trim Balancing" to General Electric; No. 5,353,636 entitled "Device for Determining Misfiring of Cylinders in Multi-cylinder Engines" to Toyota; No. 5,068,876 entitled "Phase Shift Angle Detector" to Sharp; No. 5,097,220 entitled "Circuit for Demodulating PSK Modulated Signal by Differential-Defection" to Japan Radio; and No. 5,063,332 entitled "Feedback Control System for a High-efficiency Class-D Power Amplifier Circuit".

Examples of three-phase motors for use with electric or hybrid vehicles, which may be utilized in accordance with the embodiments of the present invention, may be found in the following U.S. Pat. Nos.: No. 5,182,508, which issued to Schauder on Jan. 26, 1993; No. 5,194,800, which issued to Conzelmann et al. on Mar. 16, 1993; No. 5,216,212, which issued to Golowash et al. on Jun. 1, 1993; No. 5,230,402, which issued to Clark et al. on Jul. 27, 1993; and No. 5,294,853, which issued to Schluter et al. on Mar. 15, 1994.

Examples of sensors, such as speed and/or torque sensors, which may be utilized in accordance with the embodiments of the present invention, may be found in the following U.S. Pat. Nos.: No. 5,294,871, which issued to Imaseki on Mar. 15, 1994; No. 5,345,154, which issued to King on Sep. 6, 1994; No. 5,359,269, which issued to Wedeen on Oct. 25, 1994; No. 5,182,711, which issued to Takahashi et al. on Jan. 26, 1993; No. 5,245,966, which issued to Zhang et al. on Sep. 21, 1993; and No. 5,332,059, which issued to Shirakawa et al. on Mar. 15, 1994.

Examples of other media having components which may be utilized in accordance with the embodiments of the present invention, may be found in the following U.S. Pat. Nos.: No. 5,277,063, which issued to Thomas on Jan. 11, 1994; No. 5,373,630, which issued to Lucier et al. on Dec. 20, 1994; No. 5,373,632, which issued to Lucier et al. on Dec. 20, 1994.

Examples of battery-operated electric vehicles, having components, such as batteries for providing electrical power, which may be utilized in accordance with the embodiments of the present invention, may be found in the following U.S. Pat. Nos.: No. 5,229,703, which issued to Harris on Jul. 20, 1993; No. 5,325,912, which issued to Hotta et al. on Jul. 5, 1994; No. 5,332,630, which issued to Hsu on Jul. 26, 1994; No. 5,369,540, which issued to Konrad et al. on Nov. 29, 1994; No. 5,373,910, which issued to Nixon on Dec. 20, 1994.

Examples of converter arrangements, having components which may be utilized in accordance with the embodiments of the present invention, may be found in the following U.S. Pat. Nos.: No. 5,309,073, which issued to Kaneko et al. on May 3, 1994; No. 5,321,231, which issued to Schmalzriedt on Jun. 14, 1994; No. 5,341,083, which issued to Klontz et al. on Aug. 23, 1994; No. 5,350,994, which issued to Kinoshita et al. on Sep. 27, 1994; and No. 5,368,116, which issued to Iijima et al. on Nov. 29, 1994.

Some types of processors that could be utilized in accordance with the present invention may be or are disclosed by the following U.S. Pat. Nos.: 5,272,483 to Kator entitled "Navigation System"; 5,309,074 to Mizukami, entitled "Numerical Control Device with Speed Override Control"; and 5,293,318 to Fukashima, entitled "Navigation System".

Some types of speedometers that could be utilized in accordance with the present invention may be or are disclosed by the following U.S. Pat. Nos.: 5,285,650 to Lin, entitled "Automobile Condenser Electric Fan Controller"; and 5,314,037 to Shaw and Shaw, entitled "Automobile Collision Avoidance System".

Some types of steering angle sensors that could be utilized in accordance with the present invention may be or are disclosed by the following U.S. Pat. Nos.; 5,210,490 to Munch et al., entitled "Linear Position Sensor Having Coaxial or Parallel Primary and Secondary Windings"; 5,309,758 to Kubota et al., entitled "Steering Angle Sensor for Automobile"; and 5,263,737 to Furuya and Matsuura, entitled "Device for Stabilizing the Attitude of an Automobile".

Some types of methods and devices for interpolation that could be utilized in accordance with the present invention may be or are disclosed by the following U.S. Pat. Nos.: 5,184,317 to Pickett, entitled "Method and Apparatus for Generating Mathematical Functions"; 5,181,098 to Guerin and Morel, entitled "Procedure and Device for the Automatic Correction of Skew, of Color Superimposition, and of Image Uniformity for Television Cameras"; 5,235,534 to Potter, entitled "Method and Apparatus for Interpolating Between Data Samples"; 5,285,394 to Montalcini and Racciu, entitled "Electronic Polynomial Interpolation Device for Numeric Controls of Machine Tools, Particularly Milling Machines for the Machining of Dies, and Machine Comprising Said Device"; and 5,293,539 to Spence, entitled "Method and Apparatus for Calibrating Tone Reproduction in a Proofing System".

The type of storage of a family of characteristic curves that could be utilized in accordance with the present invention may be or is disclosed by the following U.S. Pat. No. ; 5,270,707 to Schulte et al., entitled "Process and Apparatus for the Avoidance of Bird Impacts on Airplanes".

Some types of automobile suspension systems that could be utilized in accordance with the present invention may be or are disclosed by the following U.S. Pat. Nos.; 5,294,146 to Tabata and Hamada, entitled "Active Suspension of Vehicle Having System of Compensation for Cornering Force"; 5,251,136 to Fukuyama et al., entitled "Actively Controlled Suspension System for Automotive Vehicles"; 5,228,719 to Fukuyama et al., entitled "Automotive Active Suspension System for Anti-rolling Control"; and 5,208,749 to Adachi et al., entitled "Method for Controlling Active Suspension System on the Basis of Rotational Motion Model".

The components disclosed in the various publications, disclosed or incorporated by reference herein, may be used in the embodiments of the present invention.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 02 501.6, filed on Jan. 27, 1995, having inventor Hans Fliege, and DE-OS 195 02 501.6 and DE-PS 195 02 501.6, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hybrid road vehicle comprising:

a chassis;

a plurality of wheels being rotationally mounted on said chassis;

a plurality of road vehicle tires being disposed on corresponding ones of said plurality of wheels; and a hybrid propulsion system, said hybrid propulsion system comprising:

an internal combustion engine;

a power supply connected to said internal combustion engine;

at least one motor for propelling at least one of said plurality of wheels;

a switching arrangement to transfer power from said power supply to said at least one motor;

an acceleration sensor arrangement to determine and generate a value of at least one acceleration-dependent variable, said at least one acceleration-dependent variable being a function of the acceleration of at least one portion of the vehicle;

a control system to control the amount of power transferred from said power supply to said at least one motor dependent on at least one of: said determined value of said at least one acceleration-dependent variable generated by said acceleration sensor arrangement, and the rate of change of said determined value of said at least one acceleration-dependent variable generated by said acceleration sensor arrangement;

said control system comprising an arrangement to minimize deterioration of said switching arrangement;

said arrangement to minimize deterioration of said switching arrangement being configured to temporarily reduce power flowing through said switching arrangement upon and during the duration of at least one of:

said determined value of said at least one acceleration-dependent variable generated by said acceleration sensor arrangement, and the rate of change of said determined value of said at least one acceleration-dependent variable exceeding a corresponding defined characteristic of the acceleration of at least one portion of the vehicle;

said arrangement to minimize deterioration of said switching arrangement being configured to substantially immediately restore power flowing through said switching circuitry subsequent to the occurrence of said at least one of:

said determined value of said at least one acceleration-dependent variable generated by said acceleration sensor arrangement, and the rate of change of said determined value of said at least one acceleration-dependent variable exceeding a corresponding defined characteristic of the acceleration of at least one portion of the vehicle, to permit substantially continuous and substantially uninterrupted operation of said vehicle.

2. A hybrid road vehicle according to claim 1:
wherein said arrangement to minimize deterioration of said switching arrangement comprises power reduction means for substantially reducing said power transferred from said power supply to said at least one motor whenever said determined value of said at least one acceleration-dependent variable generated by said acceleration sensor arrangement is within a specified range of values.

3. A hybrid road vehicle according to claim 2:
wherein said control system additionally comprises a storage arrangement to store a defined relationship between at least said at least one acceleration-dependent variable generated by said acceleration sensor arrangement and said power to be transferred from said power supply to said at least one motor; and
wherein said power reduction means additionally comprises means for transferring power from said power supply to said at least one motor according to said defined relationship.

4. A hybrid road vehicle according to claim 3, wherein said power reduction means comprises power shutoff means for substantially discontinuing said power transferred from said power supply to said at least one motor whenever said determined value of said at least one acceleration-dependent variable exceeds a first threshold value.

5. A hybrid road vehicle according to claim 4, wherein said defined relationship stored in said storage arrangement is dependent upon at least one additional variable indicative of the state of the vehicle, said at least one additional variable comprising at least one of: an instantaneous speed of the vehicle, and an instantaneous power transferred from said power supply to said at least one motor.

6. A hybrid road vehicle according to claim 5:
wherein said switching arrangement comprises at least one mechanical switch, said at least one mechanical switch comprising at least one contact element displaceable between a closed position and an open position; and
wherein said power reduction means comprises means for at least one of:
substantially reducing power transferred from said power supply to said at least one motor;
and interrupting said power transferred from said power supply to said at least one motor;
whenever said determined value of said at least one acceleration-dependent variable generated by said acceleration sensor arrangement exceeds a second threshold value, said second threshold value of said determined value of said at least one variable corresponding to an acceleration sufficient to displace said at least one contact element between said closed position and said open position.

7. A hybrid road vehicle according to claim 6, wherein:
said at least one motor comprises at least one electric motor, said at least one electric motor comprising a rotary field winding, said rotary field winding comprising a plurality of phase windings;
said power supply comprises an electronic converter system connected to said plurality of phase windings; and
said at least one mechanical switch comprises means for modifying the circuit configuration of said plurality of phase windings.

8. A hybrid road vehicle according to claim 7, wherein said plurality of phase windings comprises a three phase rotary field winding, and wherein said at least one mechanical switch comprises means for switching said three phase rotary field winding between a star connection and a delta connection.

9. A hybrid road vehicle according to claim 8, wherein the vehicle has a normal operating forward direction of travel, and wherein said acceleration sensor arrangement is positioned on the vehicle in a direction ahead of said at least one mechanical switch in said normal operating forward direction of travel.

10. A hybrid road vehicle according to claim 9, wherein the vehicle includes at least a front axle and a rear axle, at least one of said plurality of wheels being mounted on said rear axle, wherein the vehicle includes torque transmission means for transmitting torque from said at least one electric motor to said at least one of said plurality of wheels, said torque transmission means comprising at least one of: a transmission, and a universal joint shaft, and wherein the positioning of said acceleration sensor arrangement on the vehicle is at least one of: adjacent said front axle of the vehicle, and ahead of said front axle of the vehicle in said normal operating forward direction of travel.

11. A hybrid road vehicle according to claim 8:
wherein said acceleration sensor arrangement comprises means for determining a translational movement along at least a first axis of the vehicle;
wherein said defined relationship is stored in said storage arrangement in the form of a lookup table;
wherein said at least one mechanical switch comprises at least a portion of an emergency shutoff apparatus for the vehicle;
wherein said acceleration sensor arrangement comprises at least a portion of at least one of: an airbag control circuit for the vehicle, and an accident data storage apparatus for the vehicle;
wherein said at least one mechanical switch comprises an electric motor actuator, said electric motor actuator being effective to displace said at least one contact element between said closed position and said open position; and
wherein said acceleration sensor arrangement comprises at least one acceleration sensor element.

12. An electric non-rail vehicle, comprising:
a chassis;
a plurality of wheels rotationally mounted on said chassis;
a plurality of road vehicle tires disposed on corresponding ones of said plurality of wheels; and
an electric propulsion system, said electric propulsion system comprising:
at least one electric motor for propelling at least one of said plurality of wheels;
a power supply to supply electric power to said at least one electric motor;
a power transfer arrangement to transfer power from said power supply to said at least one electric motor;
said power transfer arrangement comprising switching circuitry to transfer power from said power supply to said at least one electric motor;
an acceleration sensor arrangement to sense a value of at least one acceleration-dependent variable, said value of said at least one acceleration-dependent variable being a function of the acceleration of at least one portion of the vehicle;
said power transfer arrangement comprising a control system to control the amount of power transferred from said power supply to said at least one electric motor as a function of said value of said at least one acceleration-dependent variable;

said control system comprising an arrangement to minimize deterioration of said switching circuitry;

said arrangement to minimize deterioration of said switching circuitry being configured to temporarily reduce power flowing from through said switching circuitry upon and during the duration of said at least one acceleration-dependent variable sensed by said acceleration sensor arrangement exceeding a defined characteristic of the acceleration of said at least one portion of the vehicles and said arrangement to minimize deterioration of said switching circuitry being configured to substantially immediately restore power flowing through said switching circuitry subsequent to the occurrence of said at least one acceleration-dependent variable sensed by said acceleration sensor arrangement exceeding a defined characteristic of the acceleration of said at least one portion of the vehicle, to permit substantially continuous and substantially uninterrupted operation of said vehicle.

13. An electric non-rail vehicle according to claim 12, wherein said arrangement to minimize deterioration of said switching circuitry comprises power reduction means for reducing said power transferred from said power supply to said at least one electric motor whenever said sensed value of said at least one acceleration-dependent variable is within a specified range of values.

14. An electric non-rail vehicle according to claim 13:

wherein said control system additionally comprises a memory arrangement to store a defined relationship between the power to be transferred from said power supply to said at least one electric motor as a function of the value of said at least one acceleration-dependent variable; and wherein said power reduction means comprises means for transferring power from said power supply to said at least one electric motor according to said defined relationship stored in said memory arrangement.

15. An electric non-rail vehicle according to claim 14, wherein said defined relationship stored in said memory arrangement is a function of at least one other variable relating to the operational status of the vehicle, said at least one other variable comprising at least one of: an instantaneous speed of the vehicle; and the instantaneous power being transferred from said power supply to said at least one electric motor.

16. An electric non-rail vehicle according to claim 15:

wherein said power transfer arrangement comprises at least one mechanical switch for transferring power from said power supply to said at least one electric motor, said at least one mechanical switch comprising a contact member movable between a closed position and an open position;

wherein said power reduction means comprises power termination means for terminating power transfer from said power supply, through said at least one mechanical switch, and to said at least one electric motor, whenever said sensed value of said at least one acceleration-dependent variable exceeds a value representative of a force sufficient to move said contact member from said closed position to said open position.

17. An electric non-rail vehicle according to claim 16:

wherein said electric motor comprises a rotary field winding comprising a plurality of phase windings;

wherein said power supply comprises electronic converter means connected to said plurality of phase windings; and wherein said at least one mechanical switch comprises means for switching said plurality of phase windings between a star configuration and at least one of: a delta configuration and a wye configuration.

18. An electric non-rail vehicle according to claim 17, wherein said acceleration sensor arrangement comprises at least one acceleration sensing device, each of said at least one acceleration sensing device and said at least one mechanical switch being at least one of:

mounted on, and
connected to
said at least one electric motor.

19. An electric non-rail vehicle according to claim 18:

wherein said control system comprises means for regulating said power transferred from said power supply to said at least one electric motor as a function of at least one of:
an amplitude of said at least one acceleration-dependent variable; and
the rate of change of said amplitude of said at least one acceleration-dependent variable;

wherein said acceleration sensor arrangement comprises at least one acceleration sensing device for sensing translational accelerations;

wherein said power reduction means comprises means for substantially terminating said power transferred from said power supply to said at least one electric motor whenever said sensed value of said at least one acceleration-dependent variable exceeds a first threshold value;

wherein said defined relationship between said power to be transferred from said power supply to said at least one electric motor is stored in said memory arrangement in the form of a lookup table;

wherein said at least one mechanical switch comprises a portion of an emergency off system of the vehicle;

wherein said acceleration sensor arrangement comprises a component of at least one of: an airbag control circuit of the vehicle, and an accident data storage device of the vehicle;

wherein said at least one mechanical switch comprises an actuator driven by an electric motor connected to said at least one movable contact element for moving said at least one movable contact member between said closed and open positions;

wherein the vehicle has a normal operational forward direction of travel, and wherein said acceleration sensor arrangement is disposed on said vehicle in a direction substantially forward of said at least one mechanical switch;

wherein the vehicle comprises at least one front axle and at least one rear axle, wherein at least one of said plurality of road vehicle tires is mounted on said rear axle, wherein said vehicle additionally comprises torque transmission means for transmitting torque from said at least one electric motor to said at least one of said plurality of road vehicle tires mounted on said rear axle, and wherein said acceleration sensor arrangement is positioned on the vehicle in at least one of: adjacent said front axle, and substantially forward of said front axle; and wherein said torque transmission means comprises at least one of: a transmission, and a universal joint shaft.

20. An electric motor propulsion system for a non-rail tired vehicle with an arrangement to minimize deterioration of switching circuitry which controls power flowing to at least one electric motor by temporarily reducing power flowing through said switching circuitry, said electric motor propulsion system comprising:

said at least one electric motor;

a power supply to supply power to said at least one electric motor;

said switching circuitry to transfer power from said power supply to said at least one electric motor;

an acceleration sensor arrangement to sense a value of at least one variable, said at least one variable being a function of the acceleration of at least one portion of the vehicle;

a control system to control the amount of power transferred from said power supply to said at least one electric motor dependent on at least one of: said sensed value of said at least one variable, and the rate of change of said sensed value of said at least one variable;

said arrangement to minimize deterioration of said switching circuitry comprising a portion of said control system;

said arrangement to minimize deterioration of said switching circuitry being configured to temporarily reduce power flowing through said switching circuitry upon and during the duration of said at least one variable sensed by said acceleration sensor arrangement exceeding a defined characteristic of the acceleration of said at least one portion of the vehicle; and said arrangement to minimize deterioration of said switching circuitry being configured to substantially immediately restore power flowing through said switching circuitry subsequent to said at least one variable sensed by said acceleration sensor arrangement exceeding a defined characteristic of the acceleration of said at least one portion of the vehicle, to permit substantially continuous and substantially uninterrupted operation of said vehicle.

* * * * *

UNITED STATES PATENT AND TRADEMARK OFFICE
CERTIFICATE OF CORRECTION

PATENT NO. : 5,915,488                            Page 1 of 2
DATED      : June 29, 1999
INVENTOR(S): Hans FLIEGE It is certified that error appears in the above-indentified patent and that said Letters Patent is hereby corrected as shown below:

On the title page, item [56], following the FOREIGN PATENT DOCUMENTS section, insert the following new section:

OTHER DOCUMENTS

-- "Das elektrische Getriebe von Magnet-Motor für PKW und Omnibusse", VDI-Berichte Nr. 878, Dr. P. Erhard, 1991.--.

In column 15, line 52, after 'to', delete "Mateunaga" and insert --Matsunaga--.

In column 16, line 16, after 'to', delete "Heidi" and insert --Heidl--.

In column 17, line 4, after 'to', delete "Gulazynski" and insert --Gulczynski--.

UNITED STATES PATENT AND TRADEMARK OFFICE
CERTIFICATE OF CORRECTION

PATENT NO. : 5,915,488
DATED : June 29, 1999
INVENTOR(S) : Hans FLIEGE

It is certified that error appears in the above-indentified patent and that said Letters Patent is hereby corrected as shown below:

In column 18, line 67, after 'to', delete "Kator" and insert --Kato,--.

In column 23, line 13, Claim 12, after 'the', delete "vehicles" and insert --vehicle;--.

Signed and Sealed this

Seventh Day of March, 2000

Attest:

Attesting Officer

Q. TODD DICKINSON

Commissioner of Patents and Trademarks